United States Patent [19]

Foster

[11] 4,047,411
[45] Sept. 13, 1977

[54] NUMERICALLY CONTROLLED PYRAMID ROLL FORMING MACHINE

[75] Inventor: Gene B. Foster, Seattle, Wash.

[73] Assignee: The Boeing Company, Seattle, Wash.

[21] Appl. No.: 756,360

[22] Filed: Jan. 3, 1977

[51] Int. Cl.² .......................... B21D 5/14; G01B 5/20
[52] U.S. Cl. ............................................ 72/7; 72/17; 72/173
[58] Field of Search ....................................... 72/6–12, 72/21, 17, 166, 170, 173–175

[56] References Cited

U.S. PATENT DOCUMENTS

| | | | |
|---|---|---|---|
| 3,821,525 | 6/1974 | Eaton | 72/8 X |
| 3,906,765 | 9/1975 | Foster | 72/9 |
| 3,955,389 | 5/1976 | Foster | 72/9 |

*Primary Examiner*—Milton S. Mehr
*Attorney, Agent, or Firm*—Christensen, O'Connor, Garrison & Havelka

[57] ABSTRACT

As a part to be contour formed passes through the rolls of a pyramid roll forming machine, the vertical position of the upper roll is continuously controlled. Specifically, upper roll position feedback signals are summed with position command signals and the resultant position error signals used to control hydraulic actuators. The hydraulic actuators, in turn, control the position of the upper roll. In an elongate pyramid roll forming machine (e.g. one designed to contour panels or plates) both ends of the upper roll are controlled such that the axis of the upper roll may be skewed with respect to the axes of the lower set of pyramid rolls, or lie parallel to the axes of the lower rolls. In such a machine the positions of the ends of the upper roll are continuously controllable as a part is being contour formed. In a narrow pyramid roll forming machine (e.g. one designed to contour structural parts) the vertical position of the upper roll alone is controlled, as opposed to controlling each end of the upper roll. In either case, synchronization is provided by controlling the rate of summation or comparison between position feedback signals and position command signals. Rate control is provided by sensing the rate of movement of the part through the pyramid roll forming machine and using the resultant rate information to control the rate of feedback and command position signal comparison. Part springback may be sensed and the resultant information used to modify the position errors signals prior to their being used to control the position of the upper roll.

22 Claims, 11 Drawing Figures

NUMERICALLY CONTROLLED PYRAMID ROLL FORMING MACHINE

BACKGROUND OF THE INVENTION

This invention is directed to metal forming machines and, more particularly, to pyramid roll forming machines.

There are two basic types of pyramid roll forming machines extensively used by industrial organizations to contour parts. The first type is used to contour structural elements, such as stringers, ribs, stiffeners etc., and comprises a set of narrow, interchangeable, profiled rolls mounted on short shafts cantilevered from a drive housing. The second type is used to contour sheet metal and plate and comprises a set of long, cylindrical, rolls suspended between drive housings located at each end of the rolls. These elongate rolls are normally not changed, and must be of a diameter sufficient to keep roll deflection to a minimal amount under forming loads. This deflection restriction severely limits the capability of such machines to contour form in environments where the roll diameter cannot be allowed to exceed a maximum amount, e.g. 12 inches, because of the nature of the desired contour. The prior art, however, has overcome this restriction by providing an arrangement wherein reinforcing roll sets are arranged in a semi-planetary manner about small diameter work rolls. The semi-planetary reinforcing roll sets prevent the small diameter pyramid rolls from deflecting by an excessive amount. Regardless of the longitudinal length of the rolls (e.g., narrow for shaping structural elements or elongate for forming sheet and plate), all pyramid roll forming machines include three horizontally arrayed forming rolls that form a pyramid when viewed from an end. The pyramid includes two lower rolls and an upper roll having its axis located vertically above, and horizontally between, the axes defined by the lower rolls. Usually, the lower rolls are fixed in position and the upper roll is vertically movable.

As noted above, the rolls of pyramid roll forming machines designed to bend structural elements are relatively narrow. Contrawise the rolls of pyramid roll forming machines designed to bend relatively large sheets or plates are elongate and the position of the upper roll is controlled at both ends. In the past, jack screws, hydraulic cylinders and the like have been used to control the position of the upper forming rolls of such machines. Indicating dials, adjustable position stops and the like have been used in conjunction with such control subsystems to indicate and assist in controlling the position of the upper roll. Because of the high roll forces involved, these adjusting arrangements have been primarily designed for load carrying ability, rather than precision. As a result, part accuracy and process reliability have suffered.

Further, in the past, pyramid roll forming machines have been best suited for producing relatively simple curved parts. Specifically, under variable contoured parts have been produced using prior art pyramid roll forming machines, the technique used to control such machines to produce such parts has been costly, time consuming and unreliable. More specifically, in the past, variable contoured parts have been produced by prior art roll forming machines by frequently starting and stopping the rolls as the part has progressed through the machine. This start-stop action has been required on both narrow and elongate machines to allow the operator time to manually vary the position of the adjustable forming roll. Conical part contours (as opposed to cylindrical part contours) have been produced on elongate roll forming machines in a generally similar fashion, i.e., using a start-stop technique and manual adjustment at each end of the adjustable elongate roll. Obviously, manual roll adjustments are time consuming, whereby the resultant parts are expensive to produce. Moreover, it is extremely difficult, and in many cases impossible, to reliably manually reproduce the position of the adjustable forming roll when more than one part is to be formed. As a result, usually, expensive contoured templates or gauges must be formed for the operator's use. And, frequently, multiple roll passes must be made before the desired contour is achieved.

Even more importantly, in the past, the productivity of prior art pyramid roll forming machines has been relatively low, particularly when the machines are used to create only a small number of each of a variety of different parts; even through the parts are similar and, a start-stop technique is not required. Low productivity is a direct result of the prior art requirement that the vertical position of the upper roll be manually adjusted prior to each different part being formed.

Therefore, it is an object of this invention to provide a method of and apparatus for improving the flexibility and capability of pyramid roll forming machines.

It is a further object of this invention to provide a method of and apparatus for improving the versatility and productivity of pyramid roll forming machines.

It is another object of this invention to provide a new and improved pyramid roll forming machine suitable for forming a wide variety of part contours and shapes.

It is a still further object of this invention to provide a new and improved pyramid roll forming machine adapted to create cylindrical, elliptical, conical and varying conical parts.

It is a still further object of this invention to provide a numerical control method of operating a pyramid roll forming machine.

SUMMARY OF THE INVENTION

In accordance with this invention, a numerically controlled pyramid roll forming machine and method of operation of the machine is provided. In its least complicated form, the position of the upper forming roll of the roll forming machine, with respect to the lower forming roll is continuously controlled in a closed loop manner. The continuous control is such that the radius of curvature of the part being formed is controllable throughout the length of the part, whereby elliptical as well as cylindrical part curvatures can be created.

The preferred form of the invention includes a position sensor that continuously senses the position of the upper roll. The sensed position information controls a position feedback signal that is compared or summed with a position command signal. Any error signals, produced as a result of the summation, are used to control a hydraulic actuator that controls the position of the upper roll. The command signals are, preferably, derived from a suitable numerical control signal source, such as punched or magnetic tape or cards. Further, the rate of movement of the part through the machine during contour forming is sensed and the resultant rate information used to control the rate of comparison between the position command signals and the position feedback signals so that desired contour changes occur at the appropriate part positions, as the part is being formed.

In accordance with the invention, in pyramid roll forming machines wherein the forming rolls are elongate, the position of both ends of the upper roll are controlled. The end positions are controlled such that the axis of the upper roll lies parallel to the axes of the lower rolls, or transverse (skewed) thereto. When the upper roll is in a transverse or skewed position, conical or varying conical parts can be formed, depending upon whether the position of the upper roll remains fixed or is changed as the part is formed. (A varying conical part is one wherein the end curvatures are radially different, with the end radii changing as the part is being formed.) The preferred form of an elongate pyramid roll machine, formed in accordance with the invention includes position sensors for sensing the position of the ends of the upper roll. The resultant position information controls feedback signals that are summed with end position command signals. The results summations are used to control hydraulic actuators, which control the end positions of the upper roll. Information regarding the rate of part movement is used to control the rate of summation between the end position feedback signals and the end position command signals so that desired contour or radii changes occur at appropriate part positions.

In accordance with a more sophisticated form of the present invention, one or more springback sensors sense the springback of parts as they exit from the pyramid roll forming machine. In this "adaptive" embodiment of the invention, the springback information produced by the sensors is used to modify the position error signals prior to the use of these signals to modify the position of the upper roll, such that compensation for part springback is provided. Preferably, in an elongate pyramid roll forming machine formed in accordance with the invention, a springback sensor is located near either end of a part as it exits from between the elongate pyramid rolls and the springback information developed by each sensor is used to modify its respective end position error signal.

As will be readily appreciated by those skilled in the pyramid roll forming art, in some situations, springback control is neither feasible nor desirable. In such situations, obviously, the springback or adaptive embodiment of the invention cannot be used. On the other hand, in other situations, such an embodiment can be used to provide springback compensated parts.

It will be appreciated from the foregoing summary that the invention provides a new and improved pyramid roll forming machine. Because the position of the upper roll of the roll forming machine is automatically, numerically controlled, i.e., controlled by command signals derived from a control source, as opposed to being manually controlled, overall productivity is greatly enhanced. Because the lateral position of the upper roll with respect to the lower rolls can be modified as a part is being contour formed, flexibility of part contour is greatly enhanced. For example, the invention can be used to create ellipitcal parts i.e., parts wherein the radius of curvature change as the part is being formed. Moreover, when the invention is used to control the ends of the upper roll of an elongate pyramid roll forming machine, conical and varying conical parts are readily formed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 3 is a cross-sectional view along line 3—3 of FIG. 2 (FIG. 3 also denotes a side elevational view of a narrow pyramid roll forming mechanism formed in accordance with the invention);

FIG. 6 is a summation diagram illustrating the summing of position feedback signals with position command signals;

DESCRIPTION OF THE PREFERRED EMBODIMENTS

Figure 1:
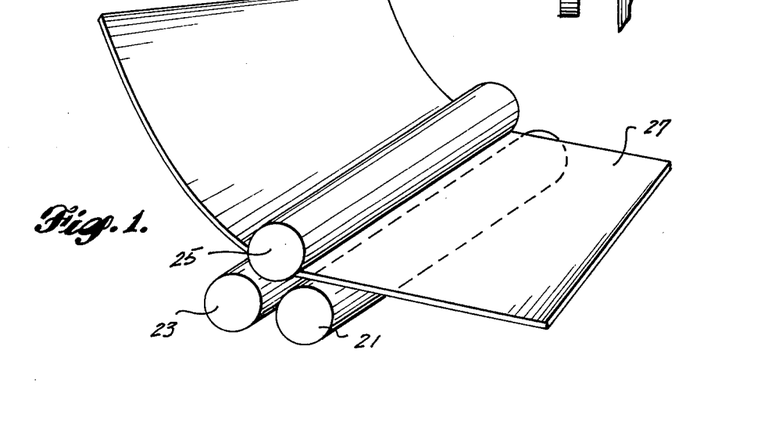
FIG. 1 is a pictorial diagram illustrating a part being contour formed by the rolls of an elongate pyramid roll forming machine.

FIG. 1 is a pictorial diagram illustrating the general position of the forming rolls of an elongate pyramid roll forming machine and the path of a part 27 passing between the rolls. Specifically, FIG. 1 illustrates three elongate forming rolls — two lower rolls 21 and 23; and an upper roll 25. As will be readily understood by those persons familiar with pyramid roll forming machines, both the upper roll and the lower rolls are driven by a suitable power source. The two lower rolls are rotatably mounted such that their axes remain fixed and lie in a common, generally horizontal, plane. Located between, and above, the two lower rolls 21 and 23 is the upper roll 25. Thus, when viewed from an end, the two lowers rolls and the upper roll generally define a pyramid.

In prior art pyramid roll forming machines, the upper roll 25 has been vertically moved, with respect to the lower rolls, by manually operated mechanical or hydraulic devices. In an elongate pyramid roll forming machine, vertical movement is created by raising or lowering the ends of the upper forming rolls and, in the past, normally taken place prior to a part 27 being moved through the forming rolls, between the upper roll, and the lower rolls, as illustrated in FIG. 1. As will be readily understood by those skilled in the roll forming art, the position of the upper roll with respect to the lower roll controls the radius of curvature (contour) of the resultant part.

In the past, one primary disadvantage of pyramid roll forming machines has been their lack of flexibility. Specifically, primarily because of the manual control arrangement previously used, the contour of a part cannot be readily changed as a part is moved between the rolls. As a result, generally, only simple curved parts have been formed using pyramid roll forming machines. Varying contour parts have been formed, but only by interrupting the rolling cycle intermittently to provide for the manual adjustment of the position adjustable (e.g. upper) roll. The present invention is directed toward making pyramid roll forming machines more flexible and versatile. In essence, an apparatus formed in accordance with the invention includes a standard pyramid roll forming mechanism modified as herein after described, and a digital control subsystem.

Figure 2:
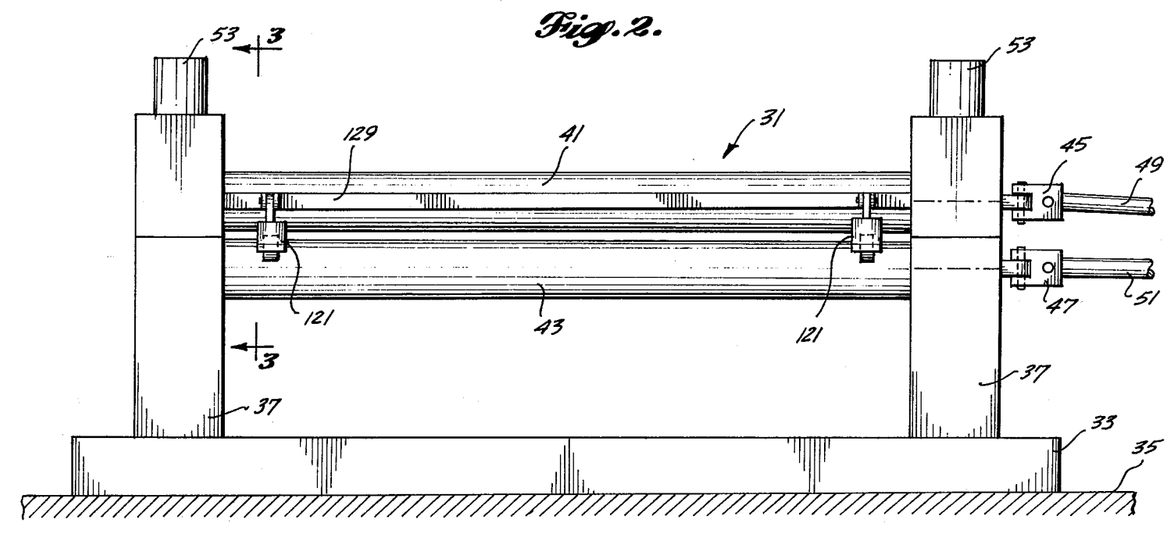
FIG. 2 is a front elevational view of an elongate pyramid roll forming mechanism formed in accordance with the invention.

FIG. 2 is a front elevational view of a pyramid roll forming mechanism 31 and includes a frame comprising a base 33 and a pair of housings 37, projecting upwardly from opposing ends of the base 33. The base 33 is adapted to support the mechanism on the floor 35 of a machine tool shop, for example. (Very large machines may incorporate a structural framework embedded in the shop floor in place of the base 33.)

The housings 37 rotatably support an upper roll 41 and a pair of lower rolls 43 (only one of which is viewable in FIG. 2) in the manner more fully described hereinafter with respect to FIGS. 3 and 4. The upper and lower rolls 41 and 43 are each connected at one end by a universal joint 45 or 47 to an associated drive shaft 49 or 51. The drive shafts 49 and 51, in turn, are connected to a suitable power source, such as a gear box driven by an electric or hydraulic motor (not shown). Alternatively, a toggle gear arrangement can be used to drive the upper roll 41.

Mounted atop each of the housings 37 is a hydraulic actuator 53. The shafts of the hydraulic actuators are connected to vertically moveable journal boxes adapted to rotatably support the ends of the upper forming roll 41 as illustrated in FIG. 3 and hereinafter described. As a result, control of the hydraulic actuators 53 results in control on the ends of the upper roll 41 and, thus, control of the vertical position of the upper roll.

Figures 3, 6, 11:
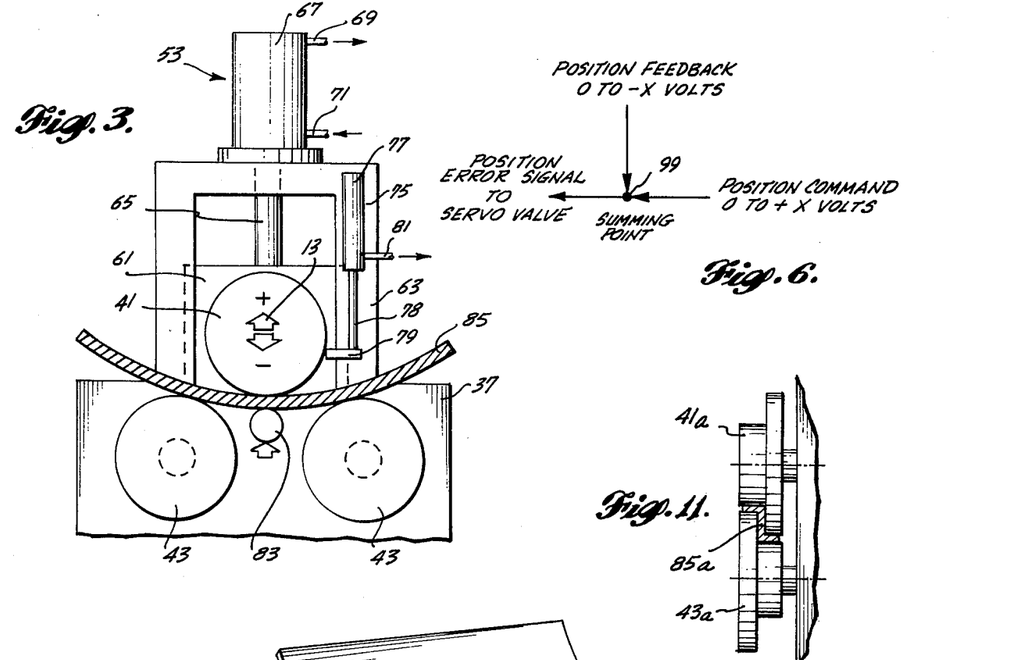
Figure 4:
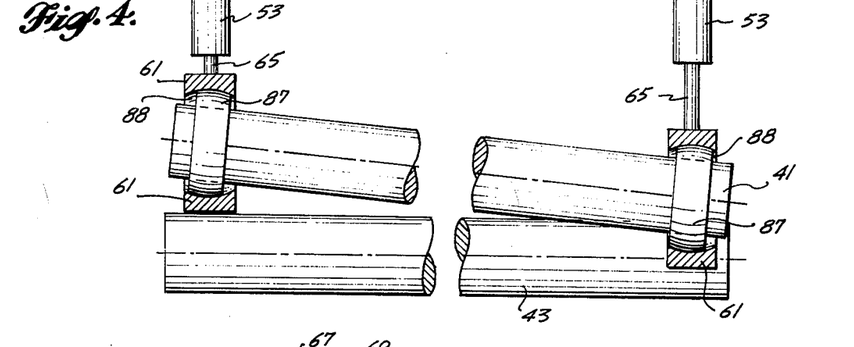
FIG. 4 is a pictorial front elevational, view, partially in section, illustrating the upper roll of an elongate pyramid roll forming mechanism having the axis of its upper roll lying transverse or skewed with respect to the axes of its lower rolls.

FIG. 3 is a cross-sectional view taken along line 3—3 of FIG. 2 and illustrates the mechanism for controlling the position of the left end (as viewed in FIG. 2) of the upper roll 41 and a mechanism for sensing the position of the same end. Specifically, the left end of the upper roll 41 is illustrated as rotatably mounted in a journal box 61. The journal box is mounted in the vertical slide of a frame 63. The frame 63 and a lower section, atop which the frame 63 is mounted, generally form the left housing 37.

The hydraulic actuator 53 is mounted atop the frame 63 such that its rod 65 is vertically arrayed. The lower end of the rod 63 of the hydraulic actuator is connected to the journal box 61. As will be readily understood by those skilled in hydraulics, the hydraulic actuator includes a cylinder 67 within which a piston is mounted. The piston is affixed to the upper end of the rod 65. Upper and lower conduits 69 and 71 communicate with chambers formed in the housing 67, on opposite sides of the piston. In a conventional manner, the flow of hydraulic fluid into and out of the chambers, via the upper and lower conduits 69 and 71, cause the piston to move upwardly and downwardly, whereby the journal box 61 and the related end of the upper roll 41 are also moved upwardly and downwardly. Such movement is illustrated by the arrows 73 shown in the center of the upper roll 41. For purposes of discussion, up movement is illustrated as positive (+) and down movement is illustrated as negative (−). Control of fluid flow to the hydraulic actuator is provided by a standard servo value.

The vertical position of the illustrated end of the upper roll is sensed by a position sensor 75. The position sensor 75 may take the form of a linear potentiometer or a linear variable differential transformer (LVDT), for examples. Regardless of its exact form, the positive sensor 75 includes a housing 77 and a linearly movable member or shaft 78. The position of the shaft with respect to the housing controls the level of an impedance or resistance, which in turn, controls the value of a signal. In the illustrated structure, the position sensor is in the form of a potentiometer having its housing affixed to the frame 63 and, its shaft 78 vertically arrayed and connected at its lower end to the journal box 61 by a bracket 79. Thus, as the journal box 61 is moved up and down by the actuator 53, the shaft 78 is moved vertically. The position of the end of the upper roll, thus, controls the value of an electrical signal present on a conductor 81 connected to the potentiometer.

In addition to a mechanisms for controlling the position of the illustrated end of the upper roll and sensing the position of that end, FIG. 3 also schematically illustrates a rate sensor 83. The rate sensor may take the form of a shaft encoder positioned so as to sense the rate of movement of a part 85 as it moves between the upper roll 41 and the lower rolls 43. In the mechanism illustrated in FIG. 3, the rate sensor is positioned beneath the upper roll and between the lower rolls. Preferably, the rate sensor includes a sensing element (e.g. serated wheel) that is spring loaded against the lower surface of the part 85. In this manner part travel, and thus part position, is monitored. As will be better understood from the following discussion the resulting part travel information is used to precisely relate changing upper roll position commands to part position.

In accordance with the invention, the ends of the upper roll of an elongate pyramid roll forming machine may be displaced by unequal amounts, with respect to the lower rolls. When such an unequal displacement exists, a part moving through the pyramid rolls will have a different radius of curvature at either end. If the position of the ends remain fixed as the part is formed the radii, while being different, will be constant. If the position of the ends changes not only will the radii be different, they will also change. In any event, in order for differential end displacement to be accomplished, it will be appreciated that each end of the upper roll must be rotatable about a horizontal axis that lies orthogonal to the axis of rotation of the upper roll. As illustrated schematically in FIG. 4, this is accomplished by mounting the bearings 87, in which the upper roll 41 is rotatably mounted, in spherically radiused housings. More specifically, the outer race of the bearing 87, in which the ends of the upper roll 41 are mounted for rotation about their longitudinal axis, is journaled in a spherical aperture 88 formed in the related journal box 61. As a result, the outer race is free to rotate about a horizontal axis, whereby compensation for the difference in vertical displacement of the ends of the upper roll 41, is provided. The universal joint 45 coupling the power source to the upper roll allows power to be applied to the upper roll even though it is unevenly displaced as its ends.

It will be appreciated from the foregoing discussion that to this point a pyramid roll forming mechanism modified such that the position of the ends of the upper roll can be independently controlled has been described. Not only is independent end position control provided, information in the form of position feedback signals denoting the position of each end of the upper roll is also provided. Finally, part position information in the form of a rate signal is provided by the output of the rate sensor.

The foregoing description, in general, pertains to an elongate pyramid roll forming machine, i.e., a roll forming machine suitable for contouring sheet and plate. However, it should be recognized that the description also applies to a narrow pyramid roll forming machine for forming structural shapes. In such a machine, FIG. 3 depicts a side elevational view of a mechanism wherein interchangeable profiled forming rolls 41a and 43a (FIG. 11) are mounted on shafts extending in a cantilevered fashion from a single journal housing. The mechanism for controlling the position of the upper forming roll and monitoring part travel are identical to those described above for use with an elongate pyramid roll forming mechanism. (It should be noted the FIG. 11 is a simplified schematic, as opposed to a detailed pictorial view, of a narrow roll forming machine.)

The following portion of the description describes a digital control subsystem that uses the signals produced by the position and rate sensors in combination with externally produced control signals to control the position of the ends of the upper roll in a manner such that a wide variety of parts can be readily formed by the invention. The raw parts can be elongate or panels or sheets, or structural elements having a variety of shapes including but not limited to Z-shapes (FIG. 11), L-shapes and T-shapes. The finished parts can have constant curvatures (e.g., cylindrical), or changing curvatures (e.g., elliptical). If the parts are sheets or panels, the radius of curvature at either end can be made equal or unequal (e.g., conical or varying conical). A block diagram of an overall pyramid roll forming machine formed in accordance with the invention and including a suitable control subsystem is illustrated in FIG. 5, and hereinafter described.

Figure 5:
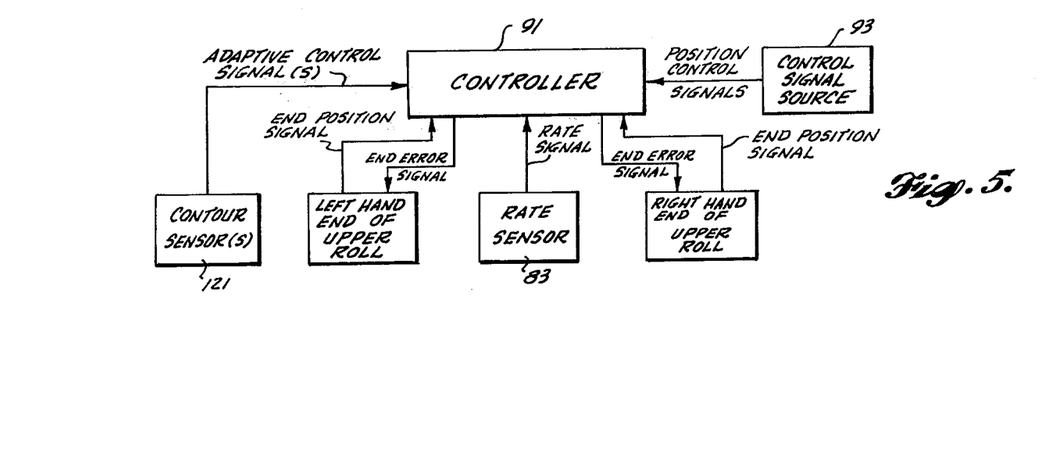
FIG. 5 is a block diagram illustrating the functional operation of a numerical controlled (N/C) pyramid roll forming machine formed in accordance with the invention.

The system illustrated in FIG. 5 includes a controller 91 connected to receive position control signals produced by a control signal source 93. The control signal source may be a punched or magnetic tape or card reader, for examples. Regardless of its exact nature, the control signal source produces position control signals adapted to control the position of the upper roll in the manner herein described. The controller 91 is also connected to the rate sensor 83 so as to receive the rate signals produced or controlled by the rate sensor. In addition, assuming an elongate pyramid roll forming mechanism is being controlled, the controller receives the end position feedback signals produced or controlled by the end position sensors 75. The controller, in essence, produces end position command signals based on the position control signals and compares the end position feedback signals with the end position command signals. End position error signals produced as a result of such comparison are used to control servo valves, which control the volumetric flow of hydraulic fluid to the hydraulic actuators 53 controlling the position of the ends of the upper roll 41. A simplified illustration of a suitable comparator is illustrated in FIG. 6. Specifically, FIG. 6 illustrates an electrical summing junction 99 adapted to sum position feedback signals having a voltage falling in the range of from 0 to $-X$ volts with position command signals having a voltage falling in the range of from 0 to $+X$ volts. The outputs of the summing junction 99 forms the error signal applied to the related servo valve. Obviously such a summation of comparison is performed for each end of the upper roll when the upper roll is an elongate roll that is controllable at either end. On the other hand, in the case of a pyramid roll forming machine designed to roll structural elements only a single summation or comparison is performed. In this regard, the controller (FIG. 5) would only receive single position control signals for controlling the position of the upper roll, not a pair of signals for independently controlling the ends, and the position of the upper roll would be sensed by a single sensor, not a pair of sensors adapted to sense the position of the end of an elongate roll.

Figure 8:
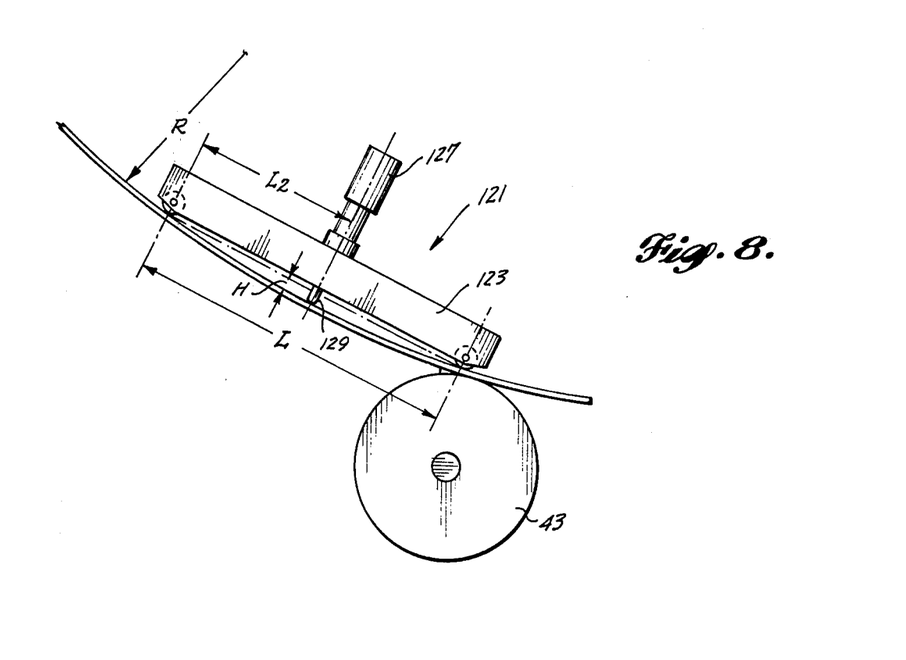
FIG. 8 is a cross-sectional schematic diagram of a sensor of the type illustrated in FIG. 7 and is used to illustrate certain geometrical relationships.
Figure 9:
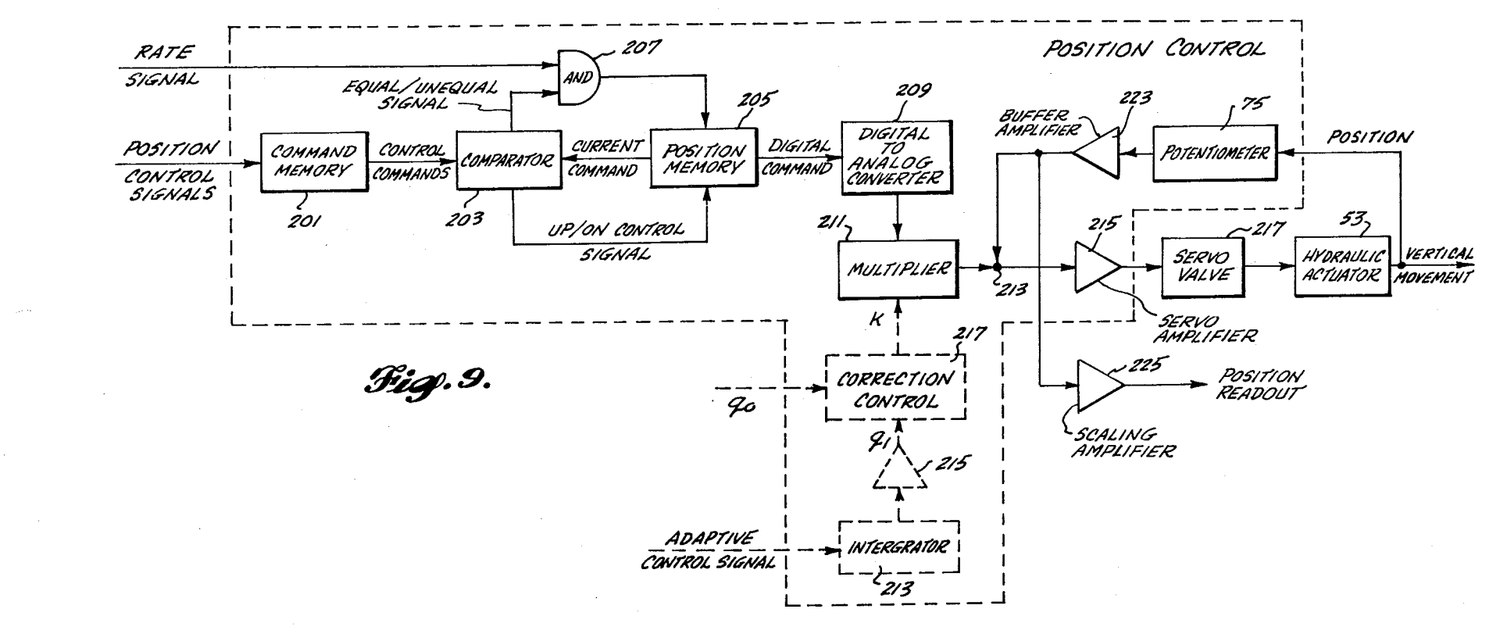
FIG. 9 is a detailed block diagram of a control system suitable for use in controlling the position of the upper roll of a pyramid roll forming mechanism in accordance with the invention.

An illustration of a more complete and detailed subsystem for carrying out the comparison step, illustrated in simple form in FIG. 6, is illustrated in FIG. 9 and hereinafter described. However, prior to describing this subsystem a description of the springback sensors illustrated in FIGS. 7 and 8 is first presented, since these sensors, if utilized, produce or control signals used in the subsystem illustrated in FIG. 9.

Figure 7:
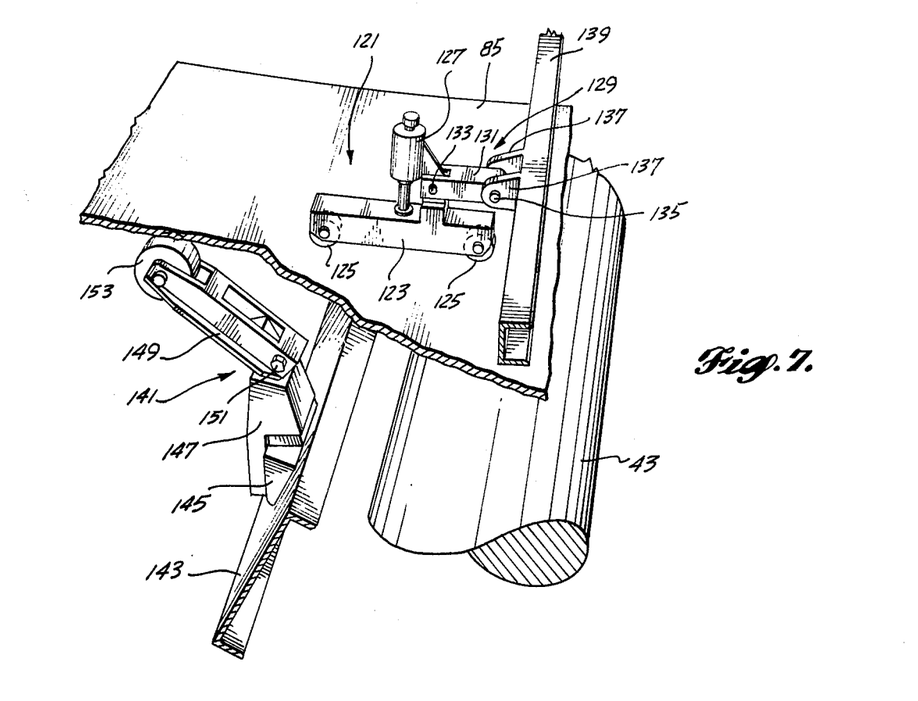
FIG. 7 is a partial perspective diagram illustrating a sensor mounted to sense the springback of a part as it exists from the pyramid forming rolls.

FIGS. 7 and 8 illustrate a uniplanar sensor 121 suitable for sensing the contour of a part as it exists from between the forming rolls. Preferably, as illustrated in FIG. 2, a sensor of this nature is mounted near each part edge when a panel or sheet is being contour formed. Regardless of how many, and were mounted, the sensors sense springback automatically. Springback, of course, is the tendency of a part to return to its original shape after being formed. The sensors sense the amount of springback that occurs by measuring actual part curvature, after part contouring has taken place.

The uniplanar sensor 121 illustrated in FIGS. 7 and 8 comprises a sensor body 123. A small roller 125 is located at the lower corner of each end of the sensor body 123. The axes of rotation of the rollers 125 is parallel to the longitudinal axis of the sensor body 123 and the sensor body is supported in the manner hereinafter described such that its longitudinal axis lies parallel to the direction of movement of the part 85 being contour formed. The rollers are, thus, separated in the direction of movement by a predetermined span, ten (10) inches, for example. This span establishes a cord of length L (FIG. 8). Mounted in the exact center of the sensor body 123 is a linear variable differential transformer (LVDT) 127, or some other form of linear transducer. The probe of the LVDT 127 is located orthogonal to the cord of length L and projects so as to intersect the part 85 midway between the rollers 125. A suitable spring (not shown) forces the probe against the part and a suitable limiting mechanism (also not shown) prevents the probe from leaving the LVDT when the sensor is not in use.

The signal controlled by the linear variable differential transformer is related to part radius by the following equation:

$$R = \frac{4H^2 + L^2}{8H}$$

where:
H = the arc length of the cord joining the rollers;
L = the cord length; and,
R = the contour radius.

It should be noted that the span of the sensor body does not necessarily need to be 10 inches. A longer or shorter span may be used. In this regard, improved sensitivity will result if a longer span is used; however, transportation signal lag will increase. The opposite result occurs if a shorter span is used; that is, sensitivity is decreased and transportation lag reduced.

In order for the information produced by the LVDT 127 to be usable, it must be related to some known position. This is accomplished in the present invention by a locating assembly 129 that maintains the rear roller 125 a fixed distance from the horizontal centerline of the exit lower roll 43. The locating assembly 129 comprises a link 131 having a U-shaped apertured end pinned to an upward projection forming a part of the sensor body 123. The upper projection lies on the side of the LVDT 127 nearest to the pyramid rolls. The upper projection is pinned to the U-shaped aperture in the link 131 by a pin 133 having a longitudinal axis lying parallel to the longitudinal axes of the lower rolls. The other end of the link 131 is connected by a pin 135 to a pair of flanges 137 projecting outwardly from an upper support channel 139 lying above the part 85. The upper support channel extends between the housings 37 and, thus, spans the part as it exists from the pyramid rolls. The pin 135 also has an axis that lies parallel to the axes of the lower rolls. While the flanges 137 are shown as located in a fixed position along the longitudinal length of the upper support channel 139, obviously, the flanges may be position adjustable, or the support channel may include a plurality of flanges to which the link 131 may be pinned.

It will be appreciated that the locating assembly, best illustrated in FIGS. 7 and 8, accurately locates the uniplanar sensor in the direction of part movement. It also will be appreciated that because of the way in which it is supported, the uniplanar sensor 121 may weight down the part 85 in the region where the sensor rides on the part. In order to prevent the sensor weight from distorting the part and, thus, the output of the sensor (or similarly, in the case of thin parts, to prevent the part from distorting as a result of its own weight when extending from the rolls, and causing the sensor to provide a false contour indication) a part support mechanism 141 may be located downstream of the sensor. The part support mechanism is attached to a lower support channel 143, lying beneath the part 85, and extending between the housings 37. Thus, the lower support channel lies parallel to the lower rolls.

The part support mechanism 141 includes a support block 145 affixed to the lower support channel 143. The support block supports a bracket 147 lying generally vertical. Angularly extending outwardly from the bracket 147, in the direction of part movement, is a support arm 149. The support arm 149 is pinned by a pin 151 to the bracket 147 so that the support arm is movable about an axis lying generally parallel to the axes of the lower rolls 43. The support arm may be spring loaded to support part and/or sensor weight. Alternatively, in the case of heavy duty applications, pneumatic or hydraulic cylinders may be used to apply the needed force to the support arm 149. Rotatably mounted in the outer end of the support arm 149 is a roller 153. The roller 153 is mounted so as to rotate in the direction of movement of the part 85. Preferably, the loading of the support arm 149, either by spring or other sources, is just adequate to compensate for the weight of the part and the uniplanar sensor 121, so as not to allow the part to elastically distort from its true contour.

Turning now to a description of the end position control subsystem illustrated in FIG. 9; it is first pointed out that a subsystem of this nature is needed to control the position of each end of the upper roll 41 in an elongate pyramid roll forming machine formed in accordance with the invention. In a narrow pyramid forming machine, i.e. one directed to contouring structural elements as schematically illustrated in FIG. 11, of course, only a single such subsystem is needed.

The end position control subsystem illustrated in FIG. 9 includes a command memory 201 suitable for storing the position signals produced by the control signal source 93. Preferably, the command memory 201 sequentially receives and stores data blocks completely describing a part shape in one continuous input using wellknown digital data techniques. As the information contained in each control signal block is needed, the data (control commands) is transferred from the memory to a comparator 203. The comparator continuously compares the incoming control commands with the last control commands produced by a position memory 205. The position memory contains the current axes position commands present in the preceeding data block. The position memory is continuously updated in the manner hereinafter described, as succeeding data blocks become active. In this regard, if a new control command and the current command are or become unequal, the comparator 203 produces two signals. One signal is a UP/DN control signal that is applied to the position memory 205. The UP/DN signal indicates the direction in which the position of the upper forming roll axis is to change, i.e., up or down with respect to the previous position, based on the direction of the difference between the control command and the current command.

The second output of the comparator is an equal/unequal signal that is applied to one input of a two-input AND gate 207. The rate signal controlled by the rate sensor 95 is applied to the second input of the AND gate 207. When the comparator determines that the new control command and the current command are unequal, the equal/unequal signal enables the AND gate 207. When enabled, the AND gate applies the rate sensor signal to the position memory 205. This signal, which is in the form of a pulse train having a frequency related to the rate of part movement through the pyramid rolls, causes the position memory to search "up" or "down" as directed by the UP/DN control signal. As a result, the position memory is searched in the appropriate direction at a rate determined by the rate of part movement. Searching continues until the control command and the current command are equal.

As the position memory is searched, it outputs a series of end digit commands, which are applied to a digital-to-analog converter 209. The digital-to-analog converter converts the end digit commands into analog commands that are applied to a summing junction 213, via a multiple 211 if the system includes and is using a springback sensor to produce adaptive control signals. The analog signals are used to control the movement of the related end of the upper roll in the summation manner generally illustrated in FIG. 6 and previously described.

In summary, it will be appreciated at this point, from viewing FIG. 9 and the foregoing description, that as long as the related end of the upper roll is correctly positioned (i.e., positioned at the point determined by the control command being produced by the command memory), the comparator will generate an equal output and no UP/DN control signal. Thus, the AND gate 207 will not be enabled and the position memory will constantly product the same end digit command. When the position of the related end of the upper roll is to change, the control command changes and an unequal output signal is produced by the comparator 203. The unequal output enables the AND gate 207 and rate pulses are applied to the position memory 205. If the control command or new position is up from the actual command or present position, an up control signal is also applied to the position memory 205. Alternatively, if the new position is down from the present position, a down control signal is applied to the position memory 205. In accordance with the received UP/DN and rate pulses, the position memory searches for an output (current command) that compares with the control command. As the searching takes place, the position memory outputs changing end digits commands that are used to move the end of the upper roll. When equality occurs, the end digit commands stabilize and upper roll end movement terminates.

As will be obvious to those skilled in the art to which this invention relates, to this point, a hardwired system using discrete subsystems and/or components has been described. Obviously, a computer control system with the above described control functions contained in a software program will serve equally as well.

Depending upon the nature of the part being formed (i.e., the material being used, the thickness of the material, the radius of curvature involved, the complexity of curvature changes, etc.), the use of a springback sensor arrangement of the type illustrated in FIGS. 7 and 8 may not be desirable. In this regard, in many situations, empirically developed springback coefficients included in the control program will provide adequate control of part contour. In any event, if desirable, the adaptive control signal produced by the springback sensor(s), positioned near one or both ends position controlled by the subsystem illustrated in FIG. 9, is (are) applied to the input(s) of an integrator(s) 213. The output(s) of the integrator(s) 213 is (are) applied through an amplifier(s) 215 to the input(s) of a correction control(s) 217. For purposes of discussion, this(these) input(s) is(are) designated $q_1$. The correction control circuit(s) 217 receives a second signal designated $q_0$. $q_0$ is a contour value signal produced by the control signal source 93. This signal is calculated from desired part geometry and designates what the expected output of the sensors should be at any particular point in time. The correction control circuit computes a correction factor signal designated K in accordance with the algorithm:

$$K = K_0 + \left[\frac{q_0}{q_1} - 1\right]$$

where: $q_0$ and $q_1$ are as indicated above; and, $K_0$ equals an initial or preceding correction factor. While the foregoing algorithm is preferred, other algorithms based on a constant (offset) factor based on machine idiosyncracies plus a proportional (e.g. $q_0/q_1$ or $q_1/q_0$) factor may be equally applicable, particularily in cases where very rapidly changing contours are involved, or where it is not desirable to include empirical springback coefficients in part program.

The correction control 217 includes a memory that stores and continuously generates the correction factor signal, which is applied to the second input of the multiplier 211. Obviously, the contour reference values ($q_0$) produced by the control signal source 93 are offset by an incremental amount equal to the transport delay in the system, i.e., the time required for a particular region of the contoured part to reach the uniplanar sensor 121, after exiting from between the pyramid rolls. Thus, the contour reference value signals ($q_0$) come on line at the time a corresponding part increment reaches the sensor and is measured.

In operation, initially, the correction control computes the $q_0/q_1$ ratio. If no previous correction factor is stored in memory, $q_0/q_1$ is used as the initial correction factor. If a $K_0$ is stored in memory $q_0/q_1 - 1$ is added to $K_0$ in accordance with the above algorithm. The next block of commands are then multiplied by the new correction factor, K, as they are received by the multiplier 211. Obviously, a K value larger than unity increases the analog output of the digital-to-analog converter and a K value of less than unity decreases the output. K will continuously change as the part is formed until $q_0 = q_1$. When this condition is satisfied, the desired part contour is being created. This last value of K is retained as the appropriate factor the remaining part length, and for succeeding parts (i.e., it is recorded for future use), unless subsequent changes in contour require the development of a new K. If a computer based control system is being used, it may be desirable to store the K values applied to each data block as the first part is contoured. Those stored values can then be used to generate a second part program refined by the springback variations experienced with the first part. In this manner springback coefficients can be fine tuned by the adaptive control system and the system relieved of the requirement to control the making of gross corrections.

Turning now to the servo control portion of FIG. 9, as noted above, the output of the multiplier 211 is applied to one input of a summing junction 213. As illustrated in FIG. 6 and previously described, the summing junction sums feedback signals with command signals. The output of the multiplier forms the command signals.

The output of the summing junction 213 is connected to the input of a servo amplifier 215. The output of the servo amplifier is applied to a servo valve 217 adapted to control the flow of hydraulic fluid to the hydraulic actuator 53. The position of the upper roll is controlled by the hydraulic actuator. The related position sensor (potentiometer 75) monitors roll position in the manner previously described. The position sensor signal is applied through a buffer amplifier 223 to the second input of the summing junction 213. As a result a control servo loop using a position command signal and a position feedback signal is formed. The summing junction 213 compares or sums the output of the multiplier 211 (the position command signal) with the position signal, as amplified by the buffer amplifier 223, (the position feedback signal). As illustrated in FIG. 6, the multiplier output may vary between zero and +X volts, for example; and, the output of the buffer amplifier 223 may vary between zero and −X volts. When the absolute value of these signals is unequal, a positive or negative error signal (equal in value to the absolute difference between the two signals) is produced. This signal is used to control the servo valve 217. Specifically, the polarity of the error signal controls the direction of movement of the hydraulic actuator and the magnitude controls the amount of movement. More specifically, in a conventional manner, the servo amplifier 215 receives the error signal and outputs a current proportional to the error. The current is applied to the torque motor of the servo valve 217, causing the spool thereof to shift in accordance with the current level and polarity, as is well known in the machine tool art. As the servo valve changes position, hydraulic fluid causes the piston of the actuator 53 to move, whereby the position of the related end of the upper roll is changed. Maintaining the upper roll in the desired position is accomplished, preferably, by metering small amounts of fluid to the actuator as required to compensate for leakage and any mechanical deflection that occurs.

Figure 10:
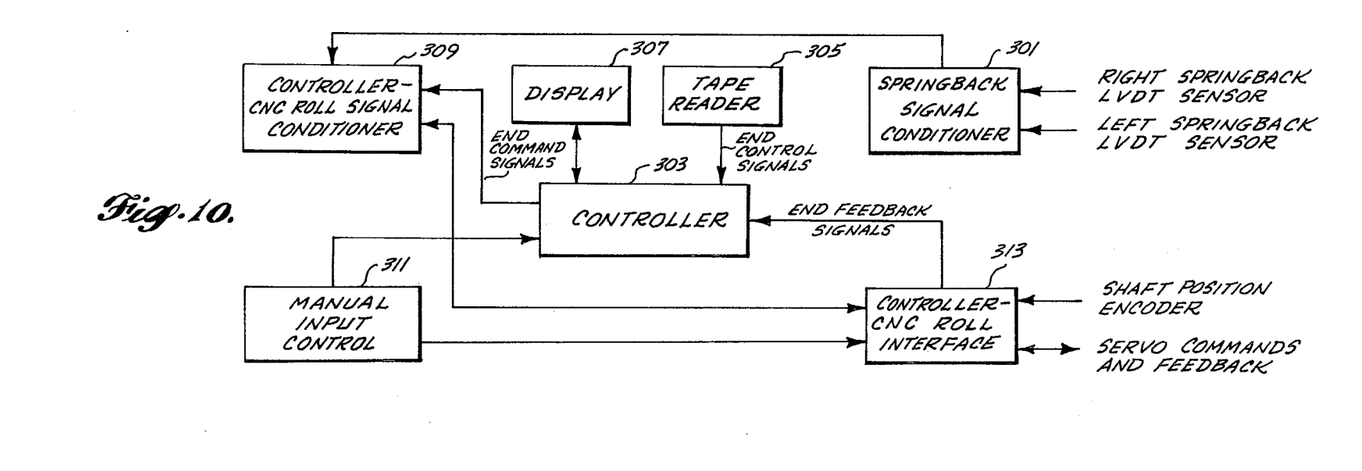
FIG. 10 is a further block diagram illustrating a data processing subsystem for controlling a pyramid roll forming mechanism in accordance with the invention; and, FIG. 11 is a schematic, front elevational view of a narrow pyramid roll forming mechanism formed in accordance with the invention and useful to contour form structural elements, such as stringers, ribs, stiffeners, etc.

Also illustrated in FIG. 10 is a scaling amplifier 225 connected to the output of the buffer amplifier 223. The output of the scaling amplifier is applied to a suitable display to provide a visual indication of the position of the upper roll.

FIG. 10 is a block diagram of an alternative system for controlling the position of the ends of the upper roll of an elongate pyramid roll forming machine formed in accordance with the invention. The system illustrated in FIG. 10 is primarily designed for implementation in mini(or micro) - processor form, even though it could be implemented in hard wired form. In general, the FIG. 10 system is based on the subsystem illustrated in FIG. 9 and previously described. However, it is implemented somewhat differently. In addition, because, in many instances, an adaptive arrangement, (i.e., one wherein springback sensed data is used to modify end command signals) cannot be used in certain environments, the system illustrated in FIG. 10 also provides for the manual modification of the command signals used to control the position of the ends of the upper roll.

More specifically, the system illustrated in FIG. 10 comprises: a springback signal conditioner 301; a controller 303; a tape reader 305; a display 307; a controller-CNC roll signal conditioner 309; a manual input control 311; and, a controller-CNC roll interface 313. The controller-CNC roll interface receives shaft signals from a shaft position encoder, e.g., rate sensor; and, feedback signals from the end position transducers (potentiometers). The received signals are appropriately conditioned by the controller-CNC roll interface 313 and applied to the controller 303. In addition, the tape reader reads a control tape and, in accordance therewith, stores end position control signals in the controller's memory. Alternatively, part programs can be input manually, read from an auxillary disc storage source or received from a remote, large scale, host computer.

The controller 303, in accordance with the end feedback and control signals, produces end command signals and applies them to the controller-CNC roll signal conditioner 309. The end command signals are suitably conditioned and, either adaptively modified if the system is using adaptive modification or not modified, as herein described, by the controller-CNC signal conditioner. The resultant signals are applied to the controller-CNC roll interface 313. The controller-CNC roll interface, in accordance with the received signals, produces servo commands that control the position of the ends of the upper roll.

If the system is conditioned to adaptively modify the end command signals, the springback signal conditioner 301 receives signals from the LVDT's of the right and left springback sensors, i.e., the sensors located near the edges of the part being formed. The springback signal conditioner conditions these signals, generally in the manner illustrated in FIG. 9 and previously described, and applies the signals to the controller-CNC signal conditioner, which appropriately modifies the end command signals prior to their application to the controller-CNC roll interface 313.

As an alternative to adaptively modifying the end command signals based on springback data, the signals can be manually modified based on operator experience, or chart or table data. This result is obtained by the operator appropriately operating the manual input control, which may be in the form of a keyboard, for example. More specifically, when it is desired to modify the end command signals in accordance with, for example, an operator's experience with the type and thickness of the metal being contour formed, the operator appropriately conditions the manual input control. In accordance therewith, the manual input control applies signals to the controller 303. The controller, in turn, modifies the end command signals prior to their application to the controller-CNC roll signal conditioner. In addition, the manual input control can be utilized to manually control the position of the upper roll. In this case, the manual input control produces signals that override signals produced by the controller. The override signals cause the upper roll to move a predetermined position. This method of operation may be used, for example, to rapidly move the upper roll to an initial position prior to a part being contour formed, or to an open position to provide for ease of removal of a part, either subsequent to its being formed or because the part has become jammed between the rolls.

A display 307, also illustrated in FIG. 10, is included to provide a means to display any desired information. For example, a display of one or both end positions at any desired point in time can be provided.

While a preferred embodiment of the invention has been illustrated and described, it will be appreciated by those skilled in the art and others that various changes can be made therein without departing from the spirit and scope of the invention. For example, rather than hydraulic control systems for controlling the position of the ends of the forming roll, other types of position control mechanisms, such as electro-mechanical mechanisms, i.e., stepping motors, may be utilized. In addition, part travel sensors other than shaft position encoders, may be utilized, if desired. Also, position sensors other than LVDT's and linear potentiometers can be utilized to sense the position of the ends of the upper roll and the curvature of a part exiting from the machine, if desired. Hence, the invention can be practiced otherwise than as specifically described herein.

The embodiments of the invention in which an exclusive property or privilege is claimed are defined as follows:

1. A numerically controlled pyramid roll forming machine comprising:
   A. a pyramid roll forming mechanism including:
      1. a pair of lower forming rolls mounted for rotation about horizontal axes lying parallel to one another;
      2. an upper forming roll mounted for rotation between and above said pair of lower forming rolls;
      3. movement means connected to said upper forming roll for moving said upper forming roll laterally with respect to said pair of lower forming rolls; and,
      4. position sensing means for sensing the position of said upper forming roll and controlling the value of feedback signals in accordance with said sensed position; and,
   B. a numerical control subsystem comprising:
      1. signal producing means for producing control signals suitable for controlling the position of said upper forming roll; and,
      2. a controller, connected to said signal producing means for receiving said control signals and to said position sensing means for receiving said feedback signals, for comparing said control signals and said feedback signals and producing position error signals in accordance with the difference between said control signals and said feedback signals and applying said position error signals to said movement means, said position error signals being suitable for causing said movement means to move said upper roll to the position dictated by said control signals.

2. A numerically controlled pyramid roll forming machine as claimed in claim 1 wherein said control signals are summed with said feedback signals to produce said position error signals.

3. A numerically controlled pyramid roll forming machine as claimed in claim 2 wherein said movement means includes a hydraulic actuator having a rod mounted for vertical movement, said rod being connected to said upper forming roll.

4. A numerically controlled pyramid roll forming machine as claimed in claim 3 including a springback sensor for sensing the curvature of a part exiting from said pyramid roll forming mechanism and producing in accordance therewith a springback signal whose value is related to the curvature of said exiting part, including any springback occurring in said part; and, wherein said controller is connected to receive said springback signals and use said springback signals to modify said position error signals prior to said position error signals being used to control the position of said upper roll.

5. A numerically controlled pyramid roll forming machine as claimed in claim 4 including a rate sensor for sensing the rate of movement of a part passing between said pair of lower forming rolls and said upper forming roll and controlling a rate signal in accordance therewith, said rate sensor connected to said controller to apply said rate signal thereto, said controller using said rate signal to control the rate of comparison of said control signals with said feedback signals.

6. A numerically controlled pyramid roll forming machine as claimed in claim 1 wherein said movement means includes a hydraulic actuator having a rod mounted for vertical movement, said rod being connected to said upper forming roll.

7. A numerically controlled pyramid roll forming machine as claimed in claim 1 including a springback sensor for sensing the curvature of a part exiting from said pyramid roll forming mechanism and producing in accordance therewith a springback signal whose value is related to the curvature of said exiting part, including any springback occuring in said part; and, wherein said controller is connected to receive said springback signals and use said springback signals to modify said position error signals prior to said position error signals being used to control the position of said upper roll.

8. A numerically controlled pyramid roll forming machine as claimed in claim 1 including a rate sensor for sensing the rate of movement of a part passing between said pair of lower forming rolls and said upper forming roll and controlling a rate signal in accordance therewith, said rate sensor connected to said controller to apply said rate signal thereto, said controller using said rate signal to control the rate of comparison of said control signals with said feedback signals.

9. A numerically controlled pyramid roll forming machine as claimed in claim 1 wherein said pair of lower forming rolls are elongate forming rolls and wherein said upper forming roll is an elongate forming roll.

10. A numerically controlled pyramid roll forming machine as claimed in claim 9 wherein said movement means includes two end movement means for moving, respectively, the two ends of said upper forming rolls.

11. A numerically controlled pyramid roll forming machine as claimed in claim 10 wherein the ends of said upper forming roll are each mounted in a journal box that allows the related end of said upper forming roll to rotate about an axis lying transverse to the axis of rotation of said upper forming roll.

12. A numerically controlled pyramid roll forming machine as claimed in claim 11 wherein each of said end movement means includes a hydraulic actuator having a rod mounted for vertical movement, each of said rods being connected to one of the carriages within which the ends of said upper forming roll are mounted.

13. A numerically controlled pyramid roll forming machine as claimed in claim 12 wherein control signals are produced for both ends of said upper forming roll and wherein said position sensing means controls the value of each of a pair of feedback signals, each of said feedback signals being related to the position of a respective end of said upper forming roll.

14. A numerically controlled pyramid roll forming machine as claimed in claim 13 wherein said control signals are summed with said feedback signals to produce said position error signals.

15. A numerically controlled pyramid roll forming machine as claimed in claim 14 including a springback sensor for sensing the curvature of a part exiting from said pyramid roll forming mechanism and producing in accordance therewith a springback signal whose value is related to the curvature of said exiting part, including any springback occuring in said part; and, wherein said controller is connected to receive said springback signals and use said springback signals to modify said position error signals prior to said position error signals being used to control the position of said upper roll.

16. A numerically controlled pyramid roll forming machine as claimed in claim 14 including a rate sensor for sensing the rate of movement of a part passing between said pair of lower forming rolls and said upper forming roll and controlling a rate signal in accordance therewith, said controller using said rate signal to control the rate of comparison of said control signals with said feedback signals.

17. A method of controlling a pyramid roll forming mechanism having a position controllable upper forming roll such that parts with varying radii contours can be formed, said method comprising the steps of:
continuously producing control signals denoting the desired radii of a part as it is being contour formed;
continuously producing feedback signals related to the position of said upper forming roll and, thus, the radii of a part as it is being formed;
continuously comparing said control signals with said feedback signals to produce position error signals; and,
using said position error signals to control the position of said upper forming roll such that said pyramid roll forming machine contour forms said part in accordance with said control signals.

18. A method of controlling a pyramid roll forming mechanism as claimed in claim 17 including the further steps of:
sensing the rate of movement of a part passing through said pyramid roll forming mechanism and producing a related rate signal in accordance therewith; and,
using said rate signal to control the rate of comparison of said control signals and said feedback signals.

19. A method of controlling an elongate pyramid roll forming mechanism as claimed in claim 18 including the further steps of:
sensing the curvature of a part as it exits from said pyramid roll forming mechanism and producing curvature signals related to said curvature; and,
using said curvature signals to modify said end position error signals prior to sand end position error signals being used to control the ends of said upper forming roll.

20. A method of controlling an elongate pyramid roll forming mechanism having a position controllable upper forming roll such that parts with varying radii contours can be formed, said method comprising the steps of:
continuously producing, for each end of said upper forming roll, control signals denoting the desired radii of a part to be formed;
continuously producing, for each end of said upper forming roll, feedback signals related to the position of the respective ends of said upper forming roll;
continuously comparing related end control signals with related end feedback signals to produce end position error signals; and,
using said end position error signals to control the ends of said upper forming roll such that as a part passes through said pyramid roll forming machine it is contour formed in accordance with said end control signals.

21. A method of controlling an elongate pyramid roll forming mechanism as claimed in claim 20 including the further steps of:
sensing the rate of movement of a part passing through said pyramid roll forming mechanism and producing a related rate signal in accordance therewith; and,
using said rate signal to control the rate of comparison of said end control signals and said end feedback signals.

22. A method of controlling an elongate pyramid roll forming mechanism as claimed in claim 21 including the further steps of:
sensing the curvature of a part as it exits from said pyramid roll forming mechanism and producing curvature signals related to said curvature; and,
using said curvature signals to modify said end position error signals prior to said end position error signals being used to control the ends of said upper forming roll.

* * * * *

UNITED STATES PATENT AND TRADEMARK OFFICE
CERTIFICATE OF CORRECTION

PATENT NO. : 4,047,411

DATED : September 13, 1977

INVENTOR(S) : Gene B. Foster

It is certified that error appears in the above-identified patent and that said Letters Patent are hereby corrected as shown below:

Col. 2, line 26, delete "itis" and insert —it is—.

Col. 3, line 63, delete "ellipitcal" and insert —elliptical—.

Col. 4, line 33, delete "exists" and insert —exits—.

Col. 5, lines 28 and 29, delete "herein after" and insert —hereinafter—.

Col. 6, line 38, delete "mechanisms" and insert —mechanism—;

line 47, delete "serated" and insert —serrated—.

Col. 7, line 12, delete "as" and insert —at—;

line 37, delete "the" and insert —that—.

Col. 8, line 41, delete "exists" and insert —exits—;

line 45, delete "were" and insert —where—.

Col. 9, line 39, delete "exists" and insert —exits—.

Col. 10, line 32, delete "wellknown" and insert —well-known—.

Col. 11, line 20, delete "product" and insert —produce—.

Col. 12, line 40, after "factor" insert —for—.

Col. 16, line 61, delete "occuring" and insert —occurring—.

UNITED STATES PATENT OFFICE
CERTIFICATE OF CORRECTION

Patent No. 4,047,411          Dated  September 13, 1977

Inventor(s)  Gene B. Foster

It is certified that error appears in the above-identified patent and that said Letters Patent are hereby corrected as shown below:

Column 17, line 38, "sand" should read -- said --.

Signed and Sealed this

Twenty-first Day of February 1978

[SEAL]

Attest:

RUTH C. MASON  
Attesting Officer

LUTRELLE F. PARKER  
Acting Commissioner of Patents and Trademarks